United States Patent
Hasegawa et al.

[19]

[11] Patent Number: 5,853,350
[45] Date of Patent: Dec. 29, 1998

[54] CONTROL DEVICE FOR LOCKUP CLUTCH

[75] Inventors: Koichi Hasegawa; Yoshinori Yamamoto; Toru Iwahashi, all of Wako, Japan

[73] Assignee: Honda Giken Kogyo Kabushiki Kaisha, Tokyo, Japan

[21] Appl. No.: 683,374

[22] Filed: Jul. 18, 1996

[30] Foreign Application Priority Data

Jul. 20, 1995 [JP] Japan .................... 7-184251

[51] Int. Cl.$^6$ ........................ F16H 6/14
[52] U.S. Cl. .................. 477/166; 477/174; 477/175
[58] Field of Search ................. 477/166, 169, 477/174, 175, 176, 180

[56] References Cited

U.S. PATENT DOCUMENTS

| | | | |
|---|---|---|---|
| 4,708,227 | 11/1987 | Kitade .................. | 477/175 |
| 4,969,545 | 11/1990 | Hayashi ............... | 477/175 X |
| 5,470,288 | 11/1995 | Palansky et al. ..... | 477/174 X |
| 5,598,336 | 1/1997 | Kume et al. ......... | 477/34 X |
| 5,616,099 | 4/1997 | Sakai .................. | 477/175 X |
| 5,628,706 | 5/1997 | Zhang ................. | 477/166 |

*Primary Examiner*—Khoi Q. Ta
*Attorney, Agent, or Firm*—Nikaido, Marmelstein, Murray & Oram LLP

[57] ABSTRACT

A target engine torque Tem and a target pump torque TPm are calculated based on a target speed ratio em set in accordance with the operational state of a vehicle, and a target lockup torque TLCm is calculated by subtracting the target pump torque TPm from the target engine torque Tem. Using, as a feed-forward term, a basic linear solenoid output pressure Qbase for generating the target lockup torque TLCm in a lockup clutch, a feed-back term calculated based on a deviation de between the actual speed ratio e and the target speed ratio em is added to the basic linear solenoid output pressure Qbase, and the engage force of the lockup clutch is controlled by the resulting linear solenoid output pressure Qout. Thus, the actual speed ratio of the torque converter quickly and accurately follows the target speed ratio set in accordance with the operational state of the vehicle.

3 Claims, 10 Drawing Sheets

CONTROL DEVICE FOR LOCKUP CLUTCH

BACKGROUND OF THE INVENTION

1. Field of the Invention

The present invention relates to a control device for a lockup clutch for controlling the speed ratio of a torque converter of an automatic transmission in accordance with the operational state of the vehicle.

2. Description of the Related Art

Such a control device for a lockup clutch is known, for example, from Japanese Patent Application Laid-open No.4-203560.

The above known control device for a lockup clutch has the following problems: an engage pressure of a lockup clutch corresponding to an engine torque is determined in accordance with the engine torque. Therefore, in a state with a large target speed ratio (almost in direct-coupled state), an appropriate engage force can be obtained. However, for example, when the target speed ratio is decreased during depression of an accelerator pedal to positively slip the torque converter, it is difficult to quickly converge the actual speed ratio into the target speed ratio, even if a correction such as by multiplying the target speed ratio by a predetermined factor is conducted.

SUMMARY OF THE INVENTION

Accordingly, it is an object of the present invention to quickly converge the actual speed ratio of the torque converter into the target speed ratio with respect to a variation in input load.

To achieve the above object, according to a first aspect and feature of the present invention, there is provided a control device for a lockup clutch for controlling the engage force of the lockup clutch such that the actual speed ratio of a torque converter of an automatic transmission becomes equal to a predetermined target speed ratio, said control device comprising: a target engine torque calculating means for calculating a target engine torque based on the predetermined target speed ratio of the torque converter determined depending upon the operational state of a vehicle; a target pump torque calculating means for calculating a target pump torque of the torque converter based on said target speed ratio; a target lockup torque calculating means for calculating a target lockup torque of the torque converter based on said target engine torque and said target pump torque; a basic engage pressure calculating means for calculating a basic engage pressure of the lockup clutch based on said target lockup torque; and a lockup clutch operating means for operating the lockup clutch based on said basic engage pressure.

With such arrangement, even if the target speed ratio is largely varied, for example, when an accelerator pedal is depressed, the actual speed ratio can be quickly allowed to follow the target speed ratio by a feed-forward control, thereby enhancing the responsiveness in a wide target speed ratio area.

According to a second aspect and feature of the present invention, in addition to the first feature, the control device for a lockup clutch further includes a deviation calculating means for calculating a deviation between the actual speed ratio and the predetermined target speed ratio of the torque converter, and an engage pressure calculating means for calculating an engage pressure of the lockup clutch by correcting the basic engage pressure in order to converge the deviation into zero, wherein the lockup clutch operating means operates the lockup clutch based on the engage pressure.

With the above arrangement, it is possible to converge the actual speed ratio into the target speed ratio with a good accuracy by a feed-back control.

According to a third aspect and feature of the present invention, in addition to the first feature, the target lockup torque calculating means corrects the calculated target lockup torque in accordance with the operational state of the vehicle.

With the third feature of the present invention, it is possible to compensate for a control delay due to a characteristic of a hydraulic system to further enhance the responsiveness.

The above and other objects, features and advantages of the invention will become apparent from the following description of a preferred embodiment taken in conjunction with the accompanying drawings.

DETAILED DESCRIPTION OF THE PREFERRED EMBODIMENT

The present invention will now be described by way of preferred embodiments with reference to the accompanying drawings.

Figure 1:
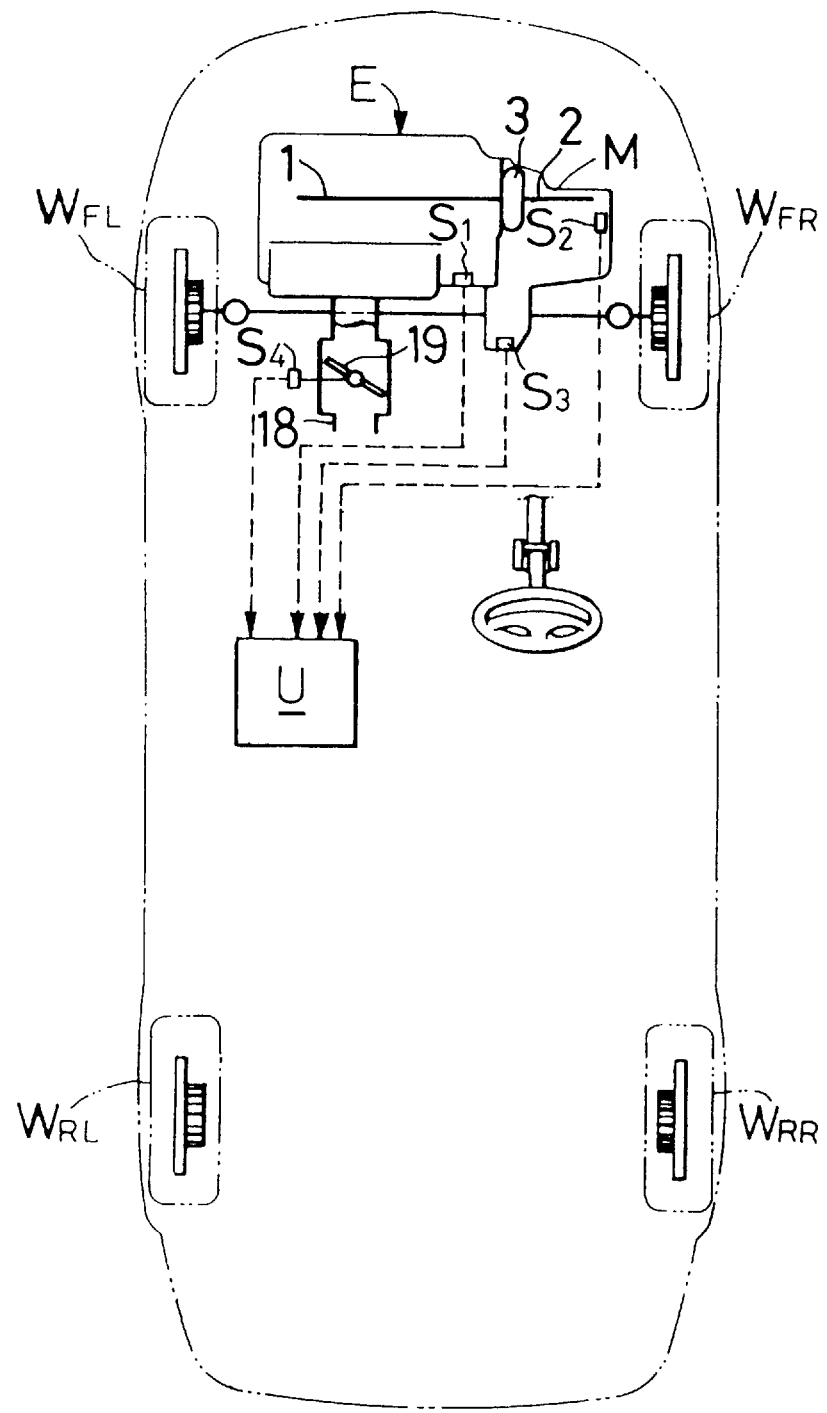
FIG. 1 is a diagrammatic illustration of the entire arrangement of a vehicle equipped with a control device for a lockup clutch according to an embodiment of the present invention.

Referring to FIG. 1, a vehicle is a front wheel drive vehicle and includes a pair of left and right driven wheels $W_{FL}$ and $W_{FR}$ to which a torque of an engine E is transmitted through an automatic transmission M, and a pair of left and right follower wheels $W_{RL}$ and $W_{RR}$ rotated with traveling of the vehicle. A known torque converter 3 is interposed between a crankshaft 1 of the engine E and a main shaft 2 of the automatic transmission M.

Figure 2:
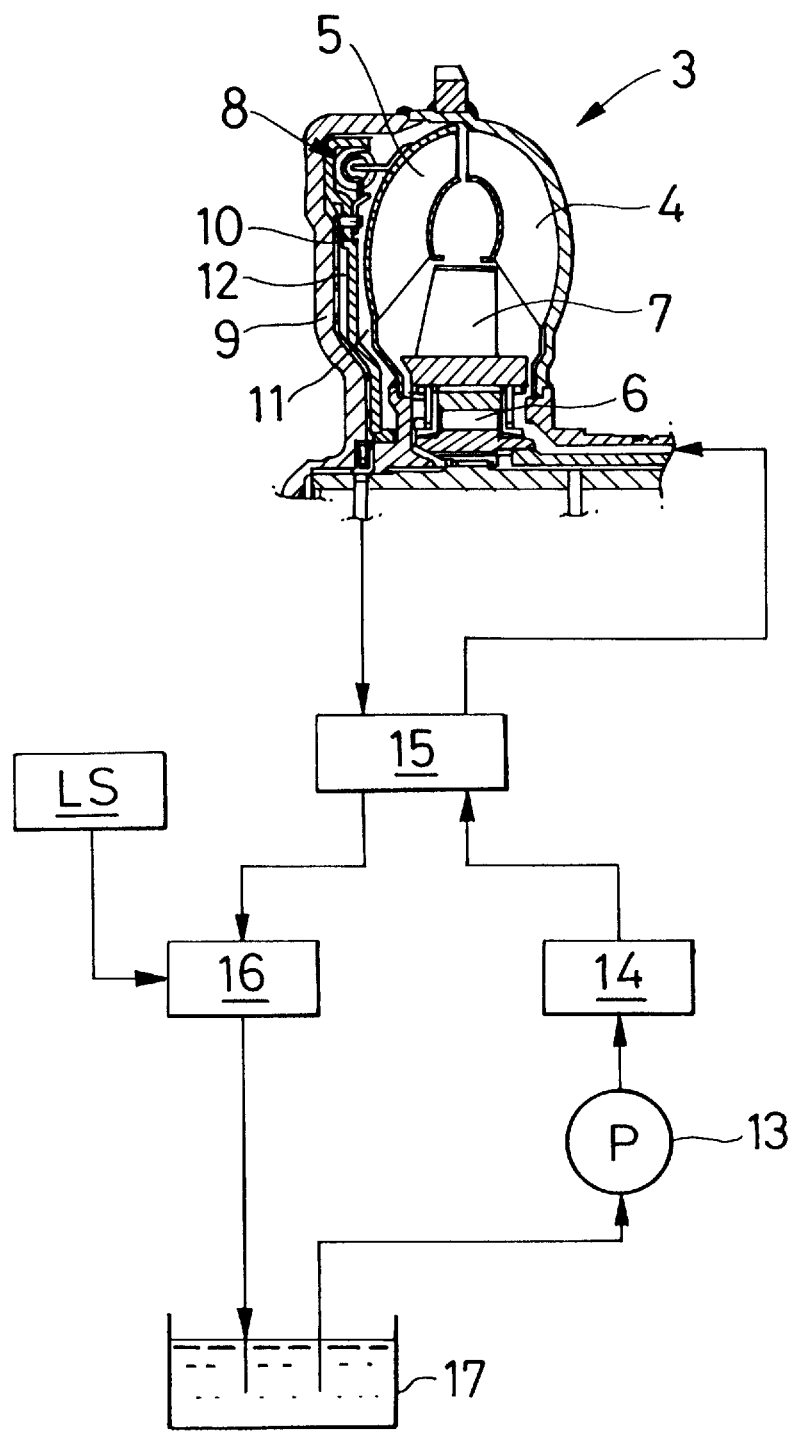
FIG. 2 illustrates a hydraulic control system for the lockup clutch.

As shown in FIG. 2, the torque converter 3 includes a pump 4 connected to the crankshaft 1, a turbine 5 connected to the main shaft 2, a stator 7 carried on a fixing portion through a one-way clutch, and a lockup clutch 8 capable of coupling the pump 4 and the turbine 5.

The lockup clutch 8 includes a clutch piston 10 capable of abutting against an inner surface of a cover 9 for the torque converter 3, and a first oil chamber 11 and a second oil chamber 12 are defined on opposite sides of the clutch piston 10. When a pressure oil is supplied into the first oil chamber 11 to bring the clutch piston 10 into abutment against the cover 9 for the torque converter 3, the lockup clutch is brought into an engaged state, thereby permitting a torque of the crankshaft 1 to be transmitted directly to the main shaft 2. When the pressure oil is supplied to the second oil chamber 12 to move the clutch piston 10 away from the cover 9 for the torque converter 3, the engagement of the lockup clutch 8 is released, thereby cutting-off the mechanical connection of the crankshaft 1 from the main shaft 2.

When the lockup clutch 8 is in its engaged state, the hydraulic oil from a hydraulic pump 13 is transmitted through a regulator valve 14 and a lockup clutch shift valve 15 to the first oil chamber 11, and the second oil chamber 12 is put into communication with a tank 17 through the lockup clutch shift valve 15 and a lockup clutch control valve 16. When an electric current value to be supplied to a linear solenoid LS is controlled, the opening degree of the lockup clutch control valve 16 is varied and as a result, the hydraulic pressure in the second oil chamber 12 (i.e., a back pressure of the clutch piston 10) is varied, whereby the engage force of the lockup clutch 8 (i.e., the back pressure of the clutch piston 10) is continuously controlled.

Returning to FIG. 1, the engine E is provided with an engine revolution-number detecting means $S_1$ for detecting a number Ne of revolutions of the engine E, and the automatic transmission M is provided with a main shaft rotation-number detecting means $S_2$ for detecting a number Nm of rotations of the main shaft, and a shift position detecting means $S_3$ for detecting a shift position P. A throttle valve 19 is incorporated in an intake passage 18 of the engine E and provided with a throttle opening degree detecting means $S_4$ for detecting a throttle opening degree $\Theta_{TH}$.

Figure 3:
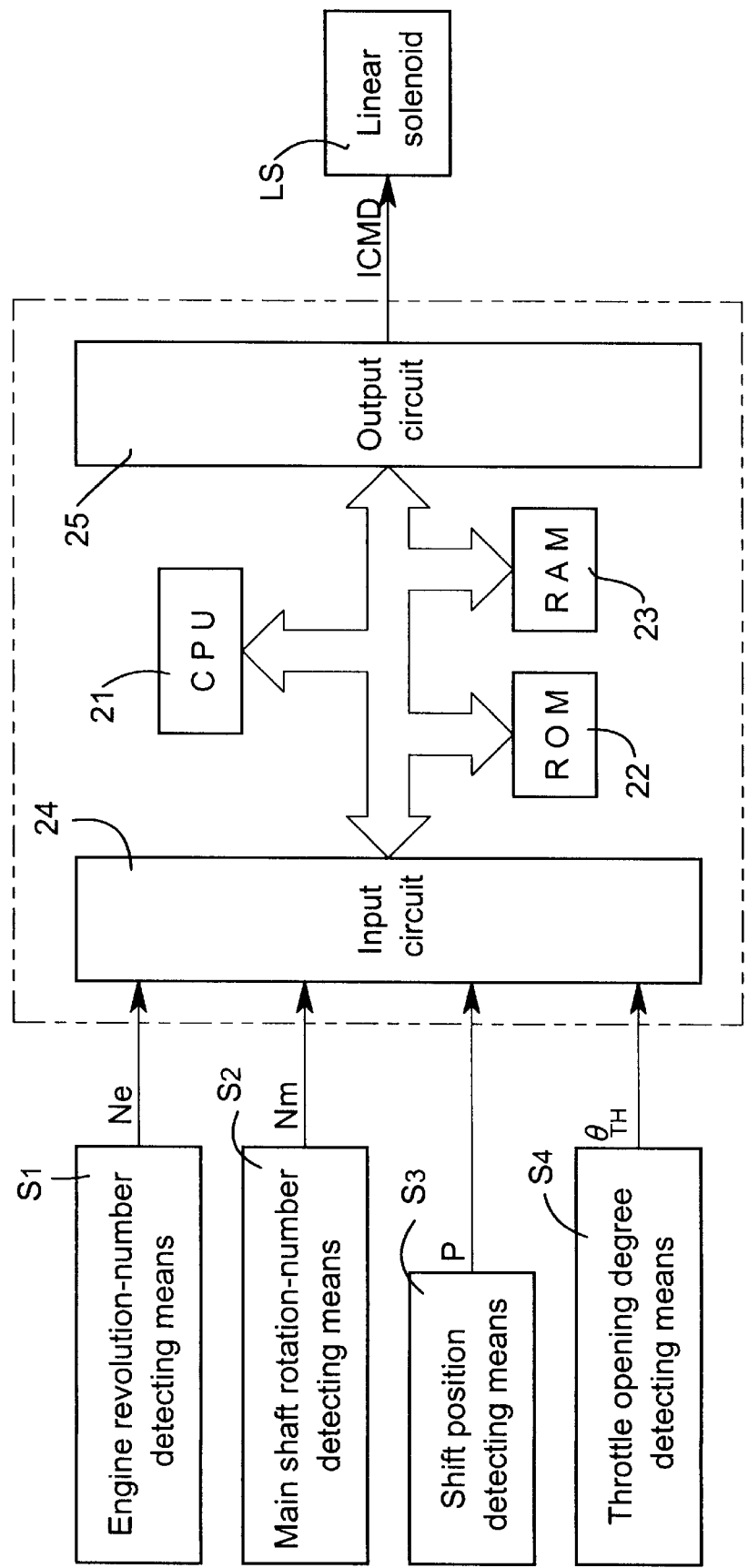
FIG. 3 is a block diagram of an electronic control unit.

FIG. 3 shows an electronic control unit U for controlling the speed ratio of the torque converter 3 by calculating signals from the various detecting means according to a control program and driving the linear solenoid LS. The electronic control unit U includes a central processing unit (CPU) 21 for conducting the above-described calculation, a read-only memory (ROM) 22 having the control program and data such as various tables stored therein, a random access memory (RAM) 23 which temporarily stores output signals from the various detecting means and the calculation result, an input circuit 24 to which the detecting means, i.e., the engine revolution-number detecting means $S_1$, the main shaft rotation-number detecting means $S_2$, the shift position detecting means $S_3$ and the throttle opening degree detecting means $S_4$ are connected, and an output circuit 25 to which the linear solenoid LS is connected.

Thus, the electronic control unit U calculates the various signals inputted thereto through the input section 24 and the data stored in the read-only memory 22 in the central processing unit 21 according to the control program, and finally controls the current value to be supplied to the linear solenoid LS through the output section 25. Thus, the engage force of the lockup clutch 8 can be varied to control the speed ratio of the torque converter 3.

Figure 4:
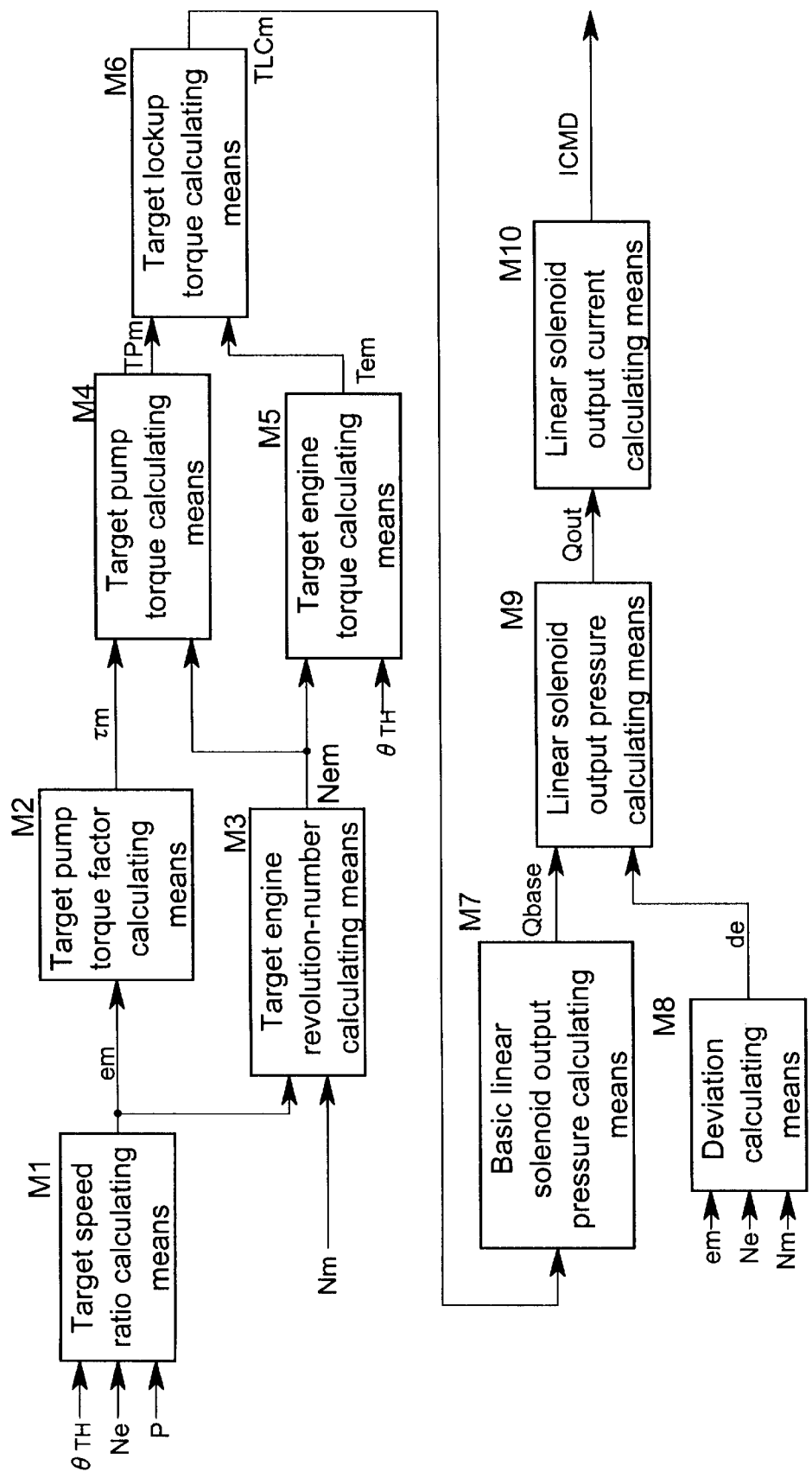
FIG. 4 is a block diagram illustrating a circuit arrangement of the control device for a lockup clutch.

FIG. 4 is a block diagram illustrating a circuit arrangement of a control device for a lockup clutch. The control device for a lockup clutch includes a target speed ratio calculating means M1, a target pump torque factor calculating means M2, a target engine revolution-number calculating means M3, a target pump torque calculating means M4, a target engine torque calculating means M5, a target lockup torque calculating means M6, a basic linear solenoid output pressure calculating means M7, a deviation calculating means M8, a linear solenoid output pressure calculating means M9, and a linear solenoid output current calculating means M10.

The operation of the embodiment of the present invention will be described below with reference to the block diagram in FIG. 4.

First, the target speed ratio calculating means M1 calculates a target speed ratio em of the torque converter 3, based on parameters indicating the operational state of the vehicle, i.e., based on the engine revolution-number Ne detected by the engine revolution-number detecting means $S_1$, the shift position P detected by the shift position detecting means $S_3$ and the throttle opening degree $\Theta_{TH}$ detected by the throttle opening degree detecting means $S_4$. An actual speed ratio e of the torque converter 3 is given according to "main shaft rotation-number N)/engine revolution-number Ne", and the target speed ratio em is a target value for the actual speed ratio e. The target speed ratio em is given, for example, by a table searching and previously set as a value such that the generation of surging or a confined sound of the torque converter 3 is prevented and moreover, an enhancement in specific fuel consumption and an enhancement in power characteristic are aimed at.

Figure 5:
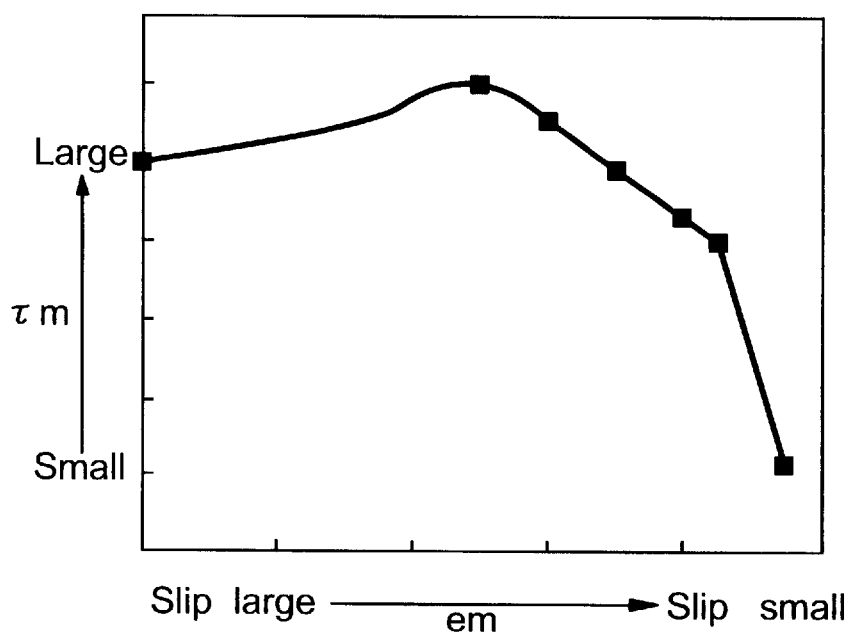
FIG. 5 is a table for searching a target pump torque factor $\tau$.

The target pump torque factor calculating means M2 searches a target pump torque factor τm from an em-τm table in FIG. 5, based on the target speed ratio em.

The target engine revolution-number calculating means M3 calculates a target engine revolution-number Nem according to the following equation based on the main shaft rotation-number Nm detected by the main shaft rotation-number detecting means $S_2$ and the target speed ratio em:

$$Nem=Nm/em \text{ - - -} \quad (1)$$

The target pump torque calculating means M4 calculates a target pump torque TPm according to the following equation based on the target pump torque factor τm calculated in the target pump torque factor τm calculating means M2 and the target engine revolution-number Nem calculated in the target engine revolution-number calculating means M3.

$$TPm=\tau m \times (Nem/1000)^2 \text{ - - -} \quad (2)$$

Figure 6:
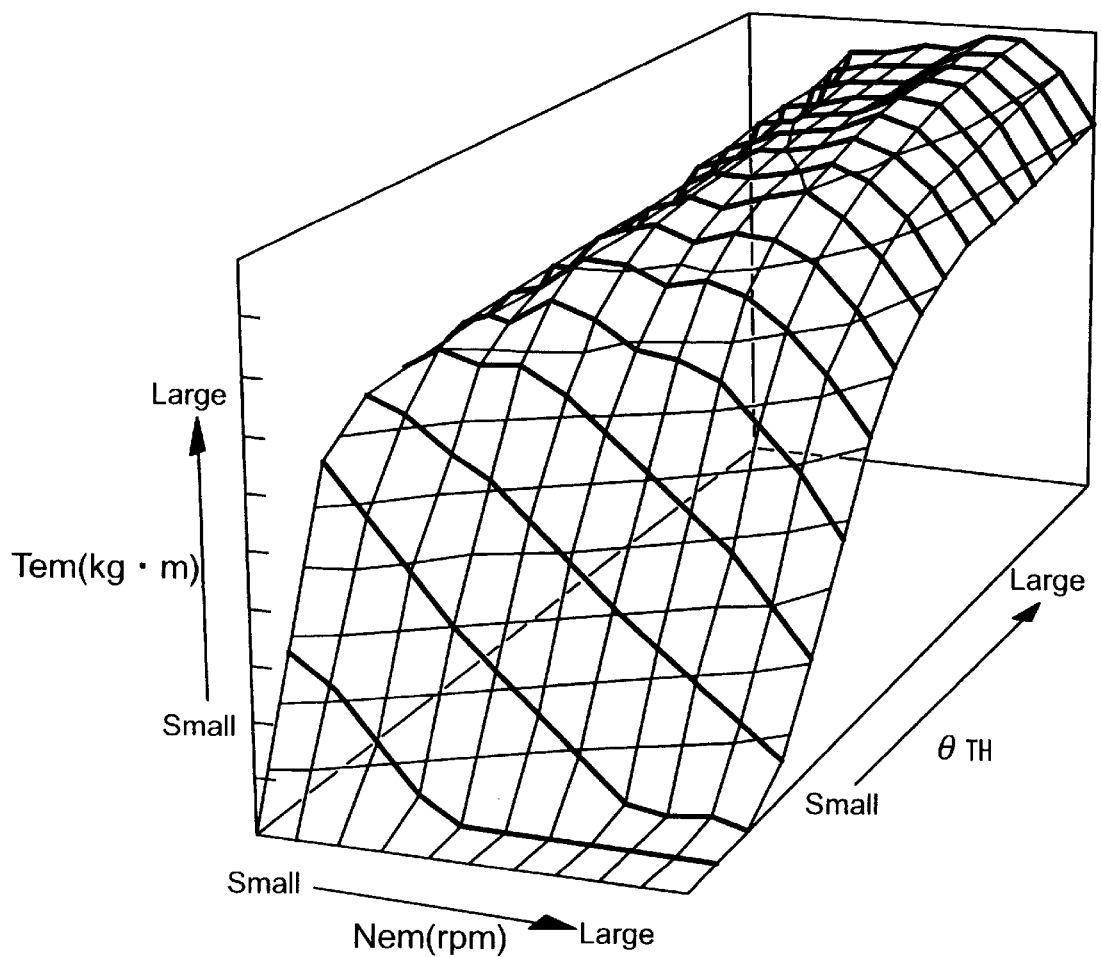
FIG. 6 is a table for searching a target engine torque Tem.

The target engine torque calculating means M5 searches a target engine torque Tem from a three-dimensional table shown in FIG. 6, based on the target engine revolution-number Nem calculated in the target engine revolution-number calculating means M3 and the throttle opening degree ΘTH detected by the throttle opening degree detecting means $S_4$.

The target lockup torque calculating means M6 calculates a target lockup torque TLCm according to the following equation based on the target pump torque TPm calculated in the target pump torque calculating means M4, the target engine torque Tem calculated in the target engine torque calculating means M5, and a margin factor KMLC.

$$TLCm=(Tem-TPm) \times KMLC \text{ - - -} \quad (3)$$

Specifically, the engine torque is divided into two lines in the torque converter 3. The engine torque in one of the lines is fluidly transmitted as a pump torque to the automatic transmission M, and the engine torque in the other line is mechanically transmitted as a lockup torque to the automatic transmission M. Therefore, the magnitude of the lockup torque can be estimated by subtracting the pump torque from the engine torque. The lockup torque determined is corrected by the margin factor KMLC.

Figure 7:
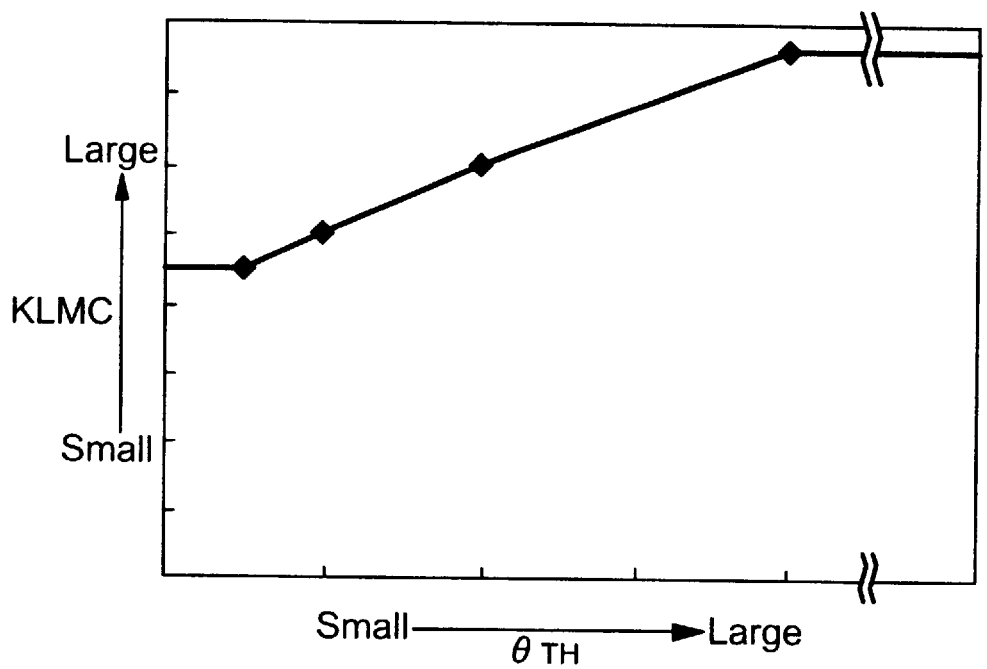
FIG. 7 is a table for searching a margin factor KMLC.

FIG. 7 shows a table for searching the margin factor KMLC from the throttle opening degree ΘTH. By establishing a relation, margin factor KMLC>1.0, excluding a low throttle opening degree area, the target lockup torque TLCm given according to the equation (3) is corrected to be increased, thereby compensating for a response delay of a hydraulic system.

Figure 8:
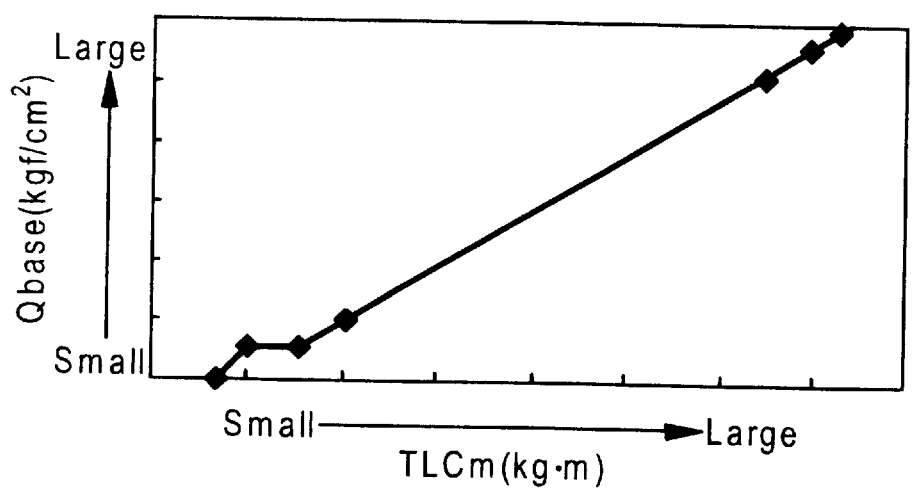
FIG. 8 is a table for searching a basic linear solenoid output pressure Qbase.

The basic linear solenoid output pressure calculating means M7 calculates a basic linear solenoid output pressure Qbase from a table shown in FIG. 8, based on the target lockup torque TLCm calculated in the target lockup torque calculating means M6.

Therefore, the basic linear solenoid output pressure Qbase is set at a value such that when the linear solenoid LS outputs its hydraulic pressure, the lockup clutch 8 transmits the target lockup torque TLCm, and the speed ratio of the torque converter is equal to the target speed ratio em.

The deviation calculating means M8 calculates a deviation de according to the following equation based on the actual speed ratio e (=Nm/Ne) calculated based on the engine revolution-number Ne and the main shaft rotation-number Nm, and the target speed ratio em:

$$de = em - e \text{ - - -} \quad (4)$$

The linear solenoid output pressure calculating means M9 calculates a linear solenoid output pressure Qout according to the following equation based on the basic linear solenoid output pressure Qbase calculated in the basic linear solenoid output pressure calculating means M7 and the deviation de calculated in the deviation calculating means M8.

$$Qout = Qbase + QP + QI \text{ - - -} \quad (5)$$

In the equation (5), the basic linear solenoid output pressure Qbase constitutes a feed-forward term. In addition, QP(=Kp×de) is a feed-back P-term, wherein Kp is a p-term factor; QI(=QI+Ki×de) is a feed-back I-term, wherein Ki is an I-term factor.

Figure 9:
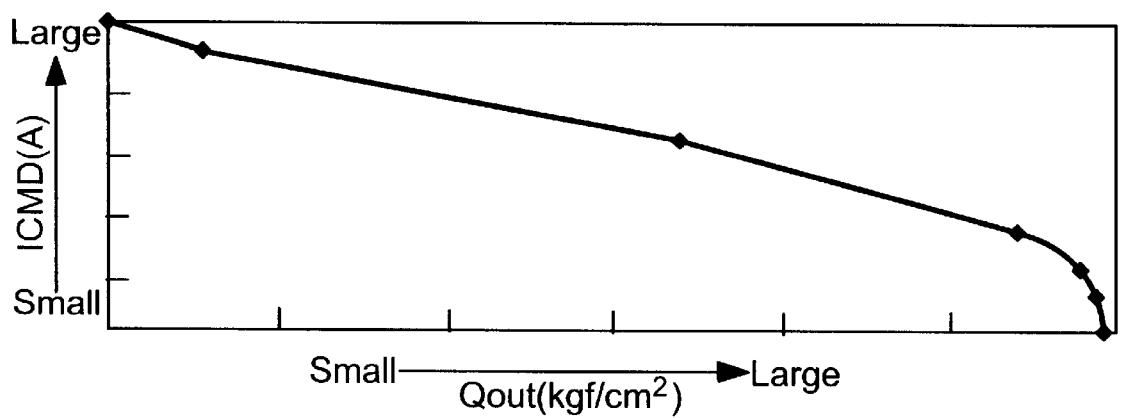
FIG. 9 is a table for searching a linear solenoid output current ICMD.

The linear solenoid output current calculating means M10 calculates a linear solenoid output current ICMD from a table shown in FIG. 9, based on the linear solenoid output pressure Qout calculated in the linear solenoid output pressure calculating means M9.

Thus, by driving the linear solenoid LS with the linear solenoid output current ICMD to regulate the engage force of the lockup clutch 8, a PI feed-back control is conducted in order to converge the actual speed ratio e of the torque converter 3 into the target speed ratio em. At this time, the feed-back P-term QP and I-term QI are added to the basic linear solenoid output pressure Qbase which is the feed-forward term. Therefore, it is possible not only to enhance the responsiveness by the feed-forward control to quickly converge the actual speed ratio e into the target speed ratio em, but also to converge the actual speed ratio e into the target speed ratio em with a goof accuracy by the feed-back control.

Figure 10:
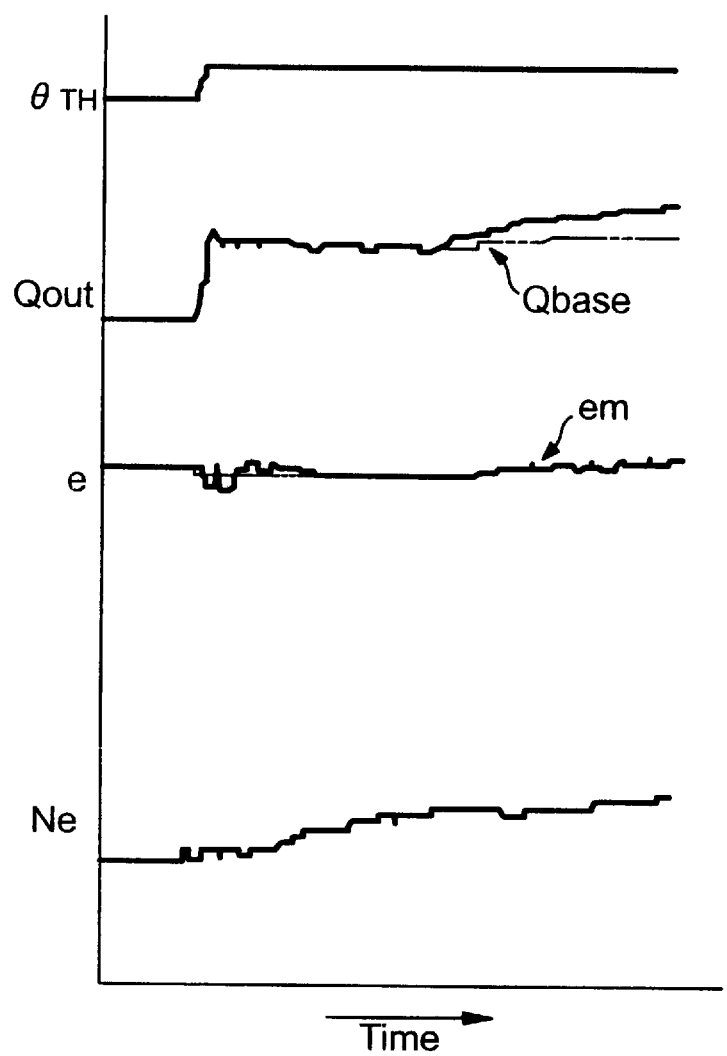
FIG. 10 and FIG. 11 are graphs illustrating variations in various parameters when an accelerator pedal is depressed.
Figure 11:
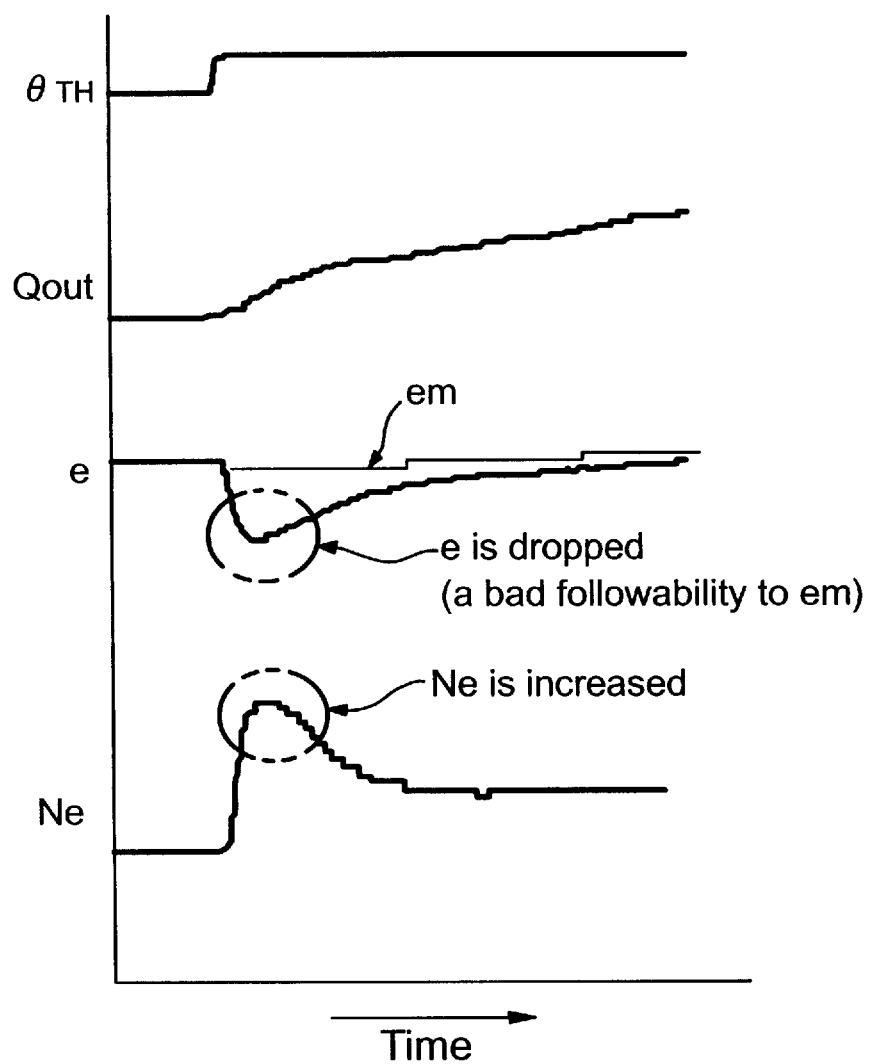

FIGS. 10 and 11 shows variations in various parameters when the accelerator pedal is depressed to increase the throttle opening degree ΘTH by 1.7/8 during cruising of the vehicle at 50 km/hr in the fourth gear shift stage. FIG. 10 corresponds to the variations in this embodiment in which both of the feed-back control and the feed-forward control are used, and FIG. 11 corresponds to the variations in the prior art in which only the feed-back control is used.

As apparent from the comparison of FIG. 10 and 11 with each other, in the prior art shown in FIG. 11, the rise of the linear solenoid output current ICMD is late and hence, the torque converter 3 is slipped, causing the actual speed ratio to be largely deviated downwards away from the target speed ratio, and as a result, the number Ne of revolutions of the engine is risen. On the other hand, in the embodiment shown in FIG. 10, the linear solenoid output current is risen quickly and hence, the slipping of the torque converter 3 is inhibited, permitting the actual speed ratio to follow the target speed ratio em and as a result, the rising of the number Ne of revolutions of the engine is avoided.

Although the embodiment of the present invention has been described in detail, it will be understood that the present invention is not limited to the above-described embodiment, and various modifications may be made without departing from the subject matter and scope of the invention defined in claims.

What is claimed is:

1. A control device for a lockup clutch for controlling the engage force of the lockup clutch such that the actual speed ratio of a torque converter of an automatic transmission becomes equal to a predetermined target speed ratio, said control device comprising:

a target engine torque calculating means for calculating a target engine torque based on an operational state of a vehicle and a predetermined target speed determined as a function of a main shaft speed and said predetermined target speed ratio;

a target pump torque calculating means for calculating a target pump torque of the torque converter based on a characteristic map of said predetermined target speed ratio and said main shaft speed;

a target lockup torque calculating means for calculating a target lockup torque of the torque converter based on said target engine torque and said target pump torque;

a basic engage pressure calculating means for calculating a basic engage pressure of the lockup clutch based on said target lockup torque; and a lockup clutch operating means for operating the lockup clutch based on said basic engage pressure.

2. A control device for a lockup clutch according to claim 1, further including a deviation calculating means for calculating a deviation between the actual speed ratio and the predetermined target speed ratio of the torque converter, and an engage pressure calculating means for calculating an engage pressure of the lockup clutch by correcting said basic engage pressure in order to converge said deviation into zero, wherein said lockup clutch operating means operates the lockup clutch based on said engage pressure.

3. A control device for a lockup clutch according to claim 1, wherein said target lockup torque calculating means corrects the calculated target lockup torque in accordance with the operational state of the vehicle.

* * * * *